UNITED STATES PATENT OFFICE.

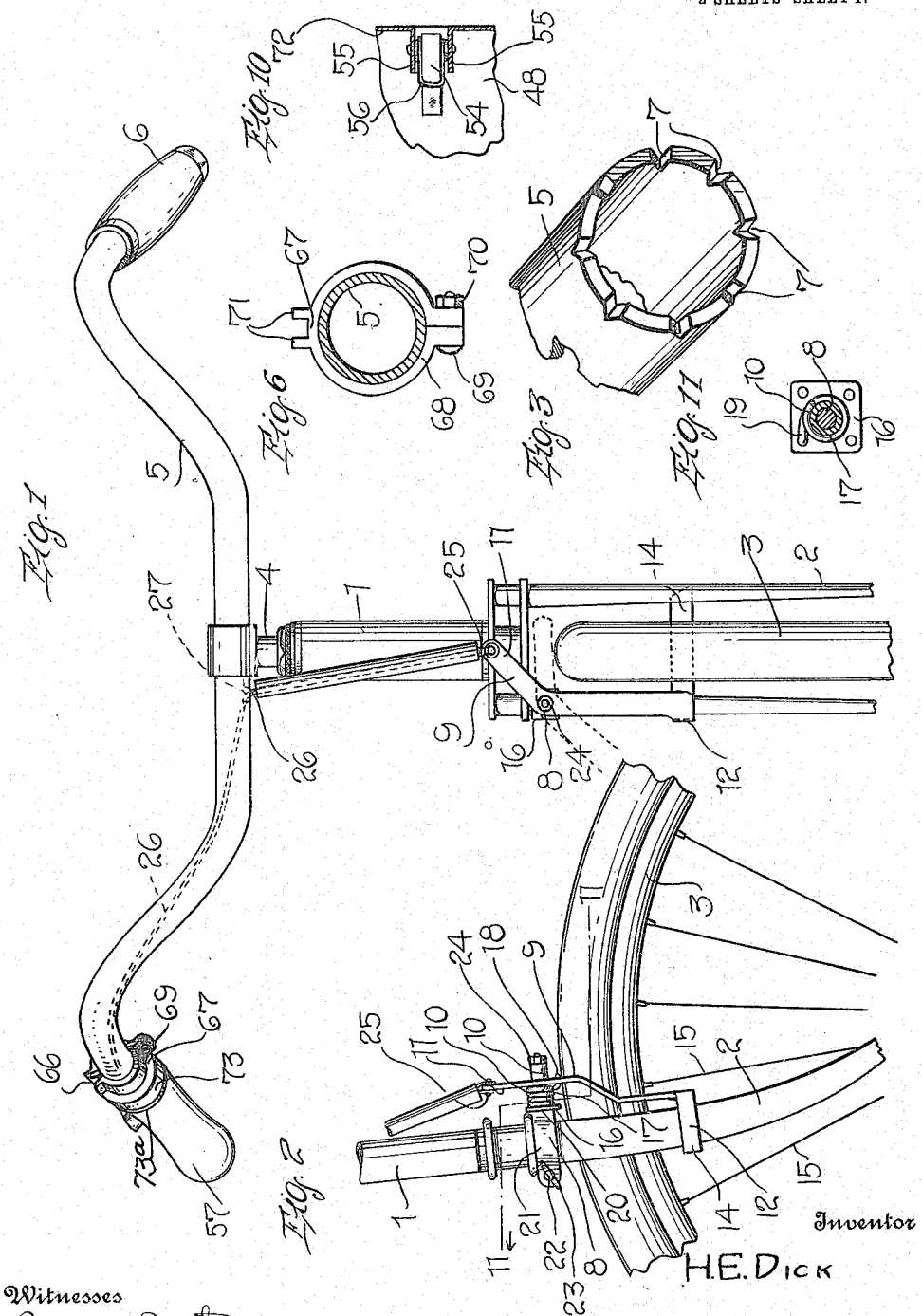

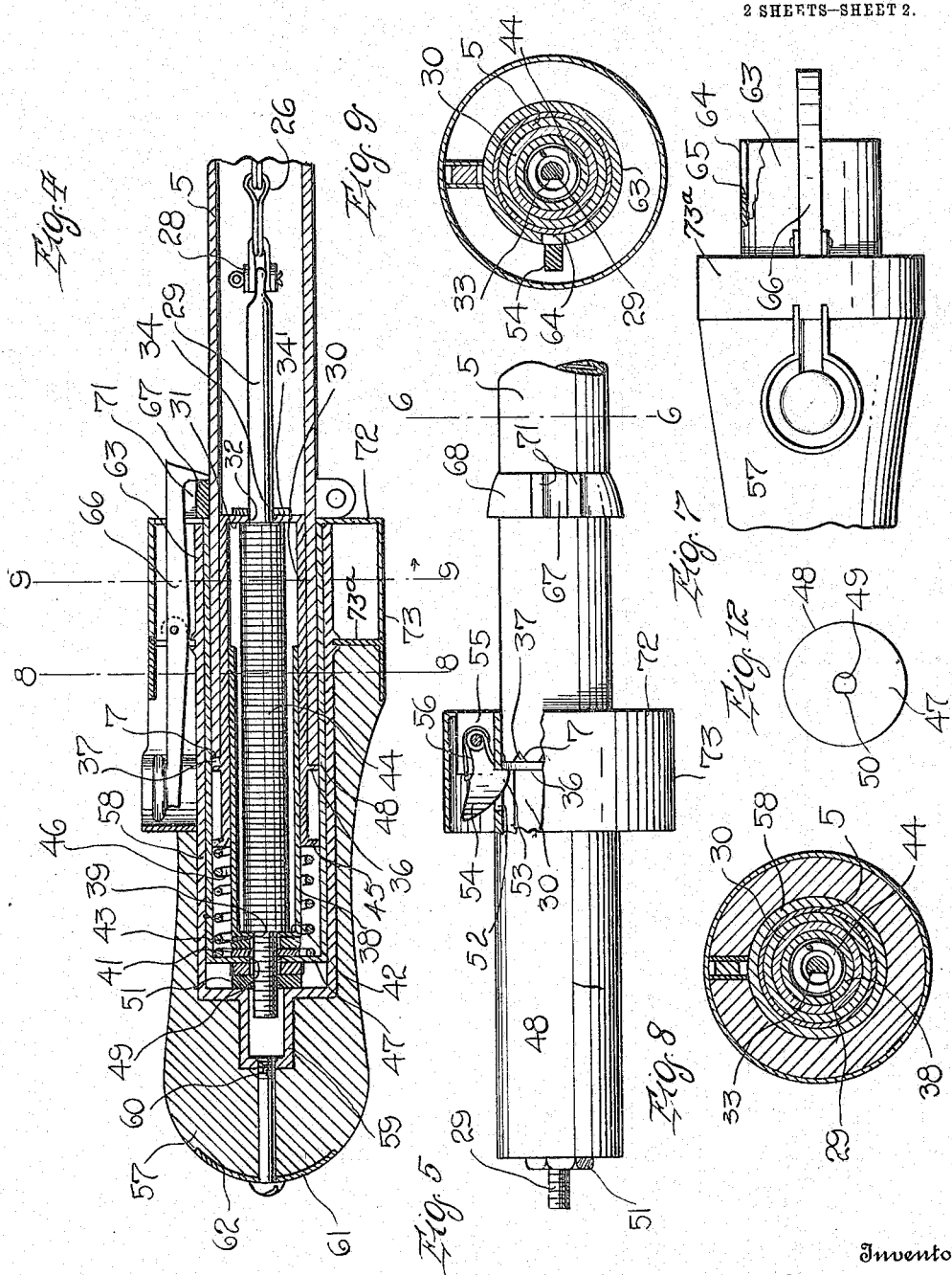

HARRY E. DICK, OF WASHINGTON, DISTRICT OF COLUMBIA.

LOCKING DEVICE FOR BICYCLES OR THE LIKE.

1,122,082.   Specification of Letters Patent.   Patented Dec. 22, 1914.

Application filed August 29, 1913. Serial No. 787,345.

*To all whom it may concern:*

Be it known that I, HARRY E. DICK, a citizen of the United States, residing at Washington, in the District of Columbia, have invented certain new and useful Improvements in Locking Devices for Bicycles or the like, of which the following is a specification, reference being had to the accompanying drawings.

This invention relates to certain improvements in locking devices for bicycles or the like and has relation more particularly to a device of this general character especially designed and adapted for use in connection with vehicles, a vehicle such as bicycles and the like, and an object of the invention is to provide a device of this general character having novel and improved means whereby the locking means may be released from locking position by any authorized person.

The invention also has for an object to provide novel and improved means whereby the locking device is under control of a detachable body whereby the locking device is maintained in inoperative position when the detachable body is in applied position.

Furthermore, the invention has for an object to provide a device of this general character wherein novel and improved means are employed for controlling the application of the detachable body, whereby it will be impossible to apply a second body for controlling the locking device by any unauthorized person.

It is a further object of the invention to provide a novel and improved device of this general character wherein the controlling member constitutes a hand grasp included in the steering means and wherein automatic means is employed for releasing the locking device when movement is imparted to the hand grasp in one direction.

The invention consists in the details of construction and in the combination and arrangement of the several parts whereby certain important advantages are attained and the device is rendered simpler, less expensive and otherwise more convenient and advantageous for use, all as will be hereinafter more fully set forth.

The novel features of the invention will be carefully defined in the appended claims.

In order that my invention may be the better understood, I will now proceed to describe the same with reference to the accompanying drawings, wherein—

Figure 1 is a view in front elevation of the head portion of a bicycle showing a locking device constructed in accordance with my invention, applied thereto; Fig. 2 is a fragmentary view in side elevation of the lower portion of Fig. 1, illustrating certain details of my invention as herein disclosed; Fig. 3 is a view in perspective of an end portion of the tubular member or handle bar as herein disclosed; Fig. 4 is a longitudinal central section taken through the controlling mechanism, for the improved device as herein embodied; Fig. 5 is a view partly in side elevation and partly in section of the relatively expansible members comprised in my invention with the operating key or device removed; Fig. 6 is a sectional view taken on the line 6—6 of Fig. 5; Fig. 7 is a view partly in top plan and partly in section of the inner end portion of the controlling key or handle; Fig. 8 is a sectional view taken on the line 8—8 of Fig. 4; Fig. 9 is a sectional view taken on the line 9—9 of Fig. 4; Fig. 10 is a fragmentary view partly in top plan and partly in section illustrating a certain detail of my invention; Fig. 11 is a sectional view taken through the mounting of the locking member proper, illustrating certain details of construction; and Fig. 12 is a view in end elevation of one of the barrels comprised in the expansible member.

In the accompanying drawings, I have disclosed a locking device constructed in accordance with my invention as applied to a bicycle but I do not wish to be understood as limiting myself to this particular type of vehicle as my invention is capable of use with any movable body when it is desired to hold or lock such member against unlawful use.

As disclosed in the drawings, 1 denotes the head portion of any conventional form of bicycle frame in which is mounted for axial movement the fork 2, the forward or front supporting wheel 3, while the upper portion of the stem 4 has affixed thereto in the usual manner a tubular handle bar 5 having suitably secured to one end portion the permanent hand grasp 6 while the opposite end portion of the bar 5 is provided with the inwardly directed spaced notches 7, for a purpose to be hereinafter more particularly referred to.

Suitably secured to a leg of the fork 2 is a forwardly directed post 8 of a predetermined length serving as a fulcrum for the lever member 9, such lever member being provided at a predetermined point intermediate its length with the oppositely directed sleeves 10—10 through which the post 8 is adapted to be passed, it being understood of course that such lever member 9 is provided with a suitable opening in register with the bores of the sleeves. The lever member 9 is preferably formed of strap steel and the outermost section of such strap member has its free end portion bent laterally to form the angular extension 11, the base 12 of which is adapted to bridge the adjacent leg of the fork 2 when the lever is in substantially vertical position while the stem 14 is adapted to intersect the fork 2 at the rear thereof and to project through the wheel 3, so that the contact therewith of an adjacent spoke 15 will effectually lock the wheel 3 against rotation in either direction.

In order that the lever 9 may assume a substantially horizontal or inoperative position relatively to the wheel 3, I interpose between the lever 9 and a plate 16 affixed to the post 8 adjacent the base thereof, the coil spring 17 embracing the adjacent sleeve 10 of the lever, one end portion of the spring being extended and secured to the plate 16, as at 18, while the opposite end portion of such spring 17 is angularly directed, as at 19, and adapted to bear against the under edge of the outermost portion of the lever 9 whereby it will be readily perceived that the spring member 17 will serve as an automatic means for maintaining the lever 9 in inoperative position. While the post 8 may be clamped or held to the coacting leg of the fork 2 in any manner that will operate with facility, I prefer to affix such post to the heel portion 20 of the overlapping integrally connected leaf members 21 which are adapted to straddle the leg of the fork and be frictionally held thereto through the medium of the coacting clamping bolt 22 and winged nut 23, such bolt 22 passing through registering apertures produced in the outer or free end portions of the leaf members. It is also to be observed that the outer or free end portion of the post 8 is adapted to be engaged by a retaining member 24 whereby the lever member 9 is effectually held against displacement on the post 8 and as herein shown this retaining member 24 comprises a nut or bur adapted for threaded engagement with the outer end portion of the post 8. To the free end portion of the inner extension of the lever member 9 is pivotally engaged a clevis 25 affording a connection with the flexible member 26, herein shown as a linked chain, which is directed upwardly and within the tubular handle bar 5 through the aperture or opening 27 produced in the under portions of such bar at a point closely adjacent to the connection of such bar with the stem 4, and the portion of the flexible member 26 within the tubular handle bar 5 is directed toward the end thereof which is provided with the notches 7 and has its end portion suitably secured, as at 28 to the inner end portion of the elongated endwise movable member 29 extending through a hollow cylindrical member 30 insertible in the open end of the bar 5. One end of the cylindrical member 30 is provided with the head 31 having produced therein substantially at its center the opening 32 through which the endwise movable member 29 projects and in order that such member 29 may be held against axial movement, for reasons to be hereinafter set forth, I have one side portion of such member flattened, as indicated at 33, adapted to coact with the straight portion 34 of the opening 32. The cylindrical member 30 is adapted to project a predetermined distance exteriorly of the bar 5 and the insertion of this member 30 is limited by the outwardly directed annular flange 36 suitably positioned at a predetermined point intermediate the length of such member 30 and in order that the member 30 may be held or locked against axial movement under normal conditions I provide adjacent such flange 36 the lug or projection 37 adapted to be accommodated in one of the notches 7, hereinbefore referred to.

In telescopic relation with the member 30 is the cylindrical member 38 having produced in its outer closed head 42 an opening 39 in alinement with the opening 32 in the head 31 of the member 30, such opening 39 having a straight portion in register with the straight portion 34 of the opening 32 and through this opening 39 is adapted to be extended the outer end portion of the elongated member 29 and such member 38 is held against outward endwise movement on the member 29 by the retaining member 41 endwise adjustable along such member 29 and which is herein shown as a nut in threaded engagement with the outer end portion of such member 29 and for convenience of manipulation, I find it best to interpose between the retaining member 41 and the adjacent head 42 the ring like member or washer 43 surrounding the member 29.

Surrounding the member 29 and positioned within the sections 30 and 38 and bearing against the heads 31 and 42 thereof is the expansible member 44 herein shown as a coil spring, the strength of which is materially greater than the strength of the spring 17 coacting with the lever member 9 whereby it will be readily perceived that when the endwise movable member 29 is at the limit of its outward movement, the lever member 9 will be adjusted into locking relation with the wheel 3.

The projected end portion of the member 30 is provided with the outwardly directed annular flange 45 against which is adapted to bear the end portion of the expansible member 46 herein shown as a coil spring embracing the section 38, while the opposite or outer end portion of such member 46 is adapted to bear against the head 47 at the outer end of the barrel 48 which is adapted to receive the member 38 and to telescopically engage the outer end portion of the bar 5, and the head 47 is provided with the opening 49 having the straight portion 50 and through which the endwise movable member 29 is adapted to be moved, the outward movement of the barrel 48 longitudinally of the member 29 being under control of the endwise adjustable retaining member 51, herein shown as a nut in threaded engagement with the outer end portion of the endwise movable member 29 and adapted to contact with the adjacent head 47. The expansible member 46 possesses sufficient strength to maintain the lug 37 on the member 30 seated within one of the notches 7 whereby such member 30 is maintained normally against axial movement.

It is thought to be obvious that when the member or barrel 48 is forced inwardly to embrace the adjacent portion of the bar 5, it will cause a similar movement to the member or section 38 thereby resulting in such release of the tension maintained on the flexible connection 26 which normally serves to hold the lever member 9 in its substantially vertical position as to permit such lever member 9 under the action of the spring 17 to assume the substantially horizontal or released position, so that the wheel 3 will be free to rotate. In order, however, to hold the barrel or member 48 against inward movement, I produce therein the opening 52 through which is adapted to project the toothed portion 53 of the dog 54 pivotally mounted within the bracket 55 projecting outwardly from the barrel or member 48, such dog or pawl being under control of the spring member 56 in a well known way to maintain the toothed portion 53 of the dog 54 normally projected through the opening 52, the free end portion of such tooth 53 being thereby normally held in position to abut the intermediate flange 36 whereby it is thought to be clearly apparent that the barrel or member 48 is effectually locked against endwise inwardly directed movement.

When it is desired to impart proper movement to the barrel or sleeve 48 a suitable key or operating member must be employed, and as herein shown such key or operating member constitutes the second hand grasp for the bar 5 and is shown as comprised of a tubular body 57 having a peripheral configuration to conveniently conform to a hand grasp, and insertible snugly within the bore of the body 57 is the sleeve or barrel 58 having its inner end provided with a head 59 having the outwardly directed interiorly threaded bore 60 adapted to be engaged by the endwise adjustable clamping member 61 herein shown as a headed screw which is passed through the dish like plate 62 bearing against the outer end portion of the body 57 whereby it will be readily seen that the barrel or sleeve 58 may be effectually clamped against axial or longitudinal movement. This barrel or sleeve 58 is of such a length as to have a projected portion 63 and the lateral diameter of this sleeve or barrel 58 is such as to snugly accommodate the barrel 48 and it is to be observed that the projected portion 63 at a predetermined point in its free edge portion is provided with the inwardly directed open ended slot 64 adapted to accommodate the bracket 55 so that the portion 65 of the barrel or sleeve 58 adjacent the base of the slot 64 may ride beneath the tooth 53 to raise or elevate the same above the flange 36 so that further inward pressure will result in the requisite relative movement of the members 30 and 38 that will result in the relieving of the tension of the flexible member or connection 26, as and for the purpose hereinbefore recited.

The body 57 is adapted to be locked in its innermost position to hold the sections 30 and 38 in their compressed relation and while any means may be employed for this purpose, I prefer the construction shown in the accompanying drawings wherein the body 57 has suitably pivoted thereto the spring pressed latch 66 adapted to snap over and engage the catch or lug 67 suitably affixed to the bar 5. It is thought to be obvious that to release the body 57 so that it can be withdrawn or removed it is only necessary to depress the outer end portion of the latch 66 in a manner which is believed to be self-evident.

While I do not desire to be limited to the exact arrangement relative to the catch 67 I prefer that the same be produced with a split ring 68 adapted to surround and frictionally engage the bar 5 through the medium of the well known clamping elements 69 and 70 and in order that the latch 66 may be so guided as to properly engage the catch 67, I have the upstanding lugs 71 positioned at opposite sides of the catch 67 and between which the latch 66 is adapted to ride. I also find it of advantage in order that the relative position between the dog 54 and the catch 67 may be concealed to provide the inner end portion of the member or barrel 48 with the outwardly directed annular flange 72 having its free marginal portions bent inwardly to afford an inclosing sleeve 73 entirely inclosing the dog 54 and of such a length as to render the same invisible under general conditions, the free edge of said sleeve 73 being adapted for contact with the inner end of the body 57 or more particularly the ferrule 73ª secured thereto.

It may occur that an unauthorized person may endeavor to release the locking lever 9 from operative position by severing the flexible member 26 but in order to effectually guard against this possibility I extend the flexible member through an elongated tubular member preferably of steel of the requisite lateral dimensions and of such a length that when the locking lever 9 is maintained in its locking or vertical position as to extend from the upper end portion of such lever 9 to closely adjacent the bar 5.

From the foregoing description, it is thought to be obvious that a locking device for bicycles or the like constructed in accordance with my invention is of an extremely simple and comparatively inexpensive nature and is particularly well adapted for use by reason of the convenience and facility with which it may be controlled, and it will also be understood that I do not wish to be understood as limiting myself to the precise arrangement and formation of the several parts herein shown in carrying out my invention in practice.

Having thus fully described my invention what I desire to claim and secure by Letters Patent is:

1. The combination with a movable member, of means for holding such member against movement comprising a locking member movable into and out of engagement with the movable member, an endwise movable member, expansible means for imparting movement to the endwise movable member in one direction, a flexible connection between the endwise movable part and the locking device whereby such locking device is caused to engage the movable member when the endwise movable part is at the limit of its movement imparted by the expansible member, and means for automatically disengaging the locking device from the movable member when the expansible member is compressed a predetermined distance.

2. The combination with a movable member, of a locking device movable into or out of engagement with the movable member, an endwise movable part, a connection between said endwise movable part and the locking device whereby movement of the endwise movable part in one direction will impart movement to the locking device relatively to the movable member, an expansible means for imparting movement to the endwise movable part including telescoping sections capable of relative movement, an expansible spring surrounding the part and housed within the telescoping sections, and means for imparting endwise movement to the part in a direction opposite to that imparted by the expansible member.

3. The combination with a movable member, of a locking device therefor mounted for movement into and out of engagement therewith, a tubular member, an endwise movable part within the tubular member and projecting therebeyond, means for moving the endwise movable member outwardly relatively to the tubular member, a flexible connection between the locking device and the endwise movable member extending through the tubular member, and means slidably engageable with the tubular member for imparting movement of the endwise movable member inwardly of the tubular member.

4. The combination with a movable member, of a locking device therefor mounted for movement into and out of engagement therewith, a tubular member, an endwise movable part within the tubular member and projecting therebeyond, means for moving the endwise movable member outwardly relatively to the tubular member, a flexible connection between the locking device and the endwise movable member extending through the tubular member, and axially adjustable means slidably engageable with the tubular member for imparting movement of the endwise movable member inwardly of the tubular member.

5. The combination with a movable member, of a locking device capable of movement into and out of engagement with the movable member, a movable part, a flexible connection between the movable part and the locking device, expansible means coacting with the movable part to impart movement thereto in one direction whereby the locking device is moved into engagement with the movable member, a member movable for compressing the expansible member and imparting movement to the endwise movable part in a direction opposite that in which it is moved by the expansible member, and means for automatically disengaging the locking device from the movable member when the expansible member is compressed.

6. The combination with a movable member, of a locking device capable of movement into and out of engagement with the movable member, a movable part, a flexible connection between the movable part and the locking device, expansible means coacting with the movable part to impart movement thereto in one direction whereby the locking device is moved into engagement with the movable member, a member movable for compressing the expansible member and imparting movement to the endwise movable part in a direction opposite that in which it is moved by the expansible member, and releasable means for locking said last named member against movement in an opposite direction.

7. The combination with a movable member, of a locking device mounted for movement into or out of engagement therewith, a tubular member, a part adapted for movement within the tubular member, a connection between the movable part and locking device whereby such locking device is moved into engagement with the movable member upon movement of said movable part in one direction, automatic means for imparting such movement to the movable part, manually operated means slidably engageable with the tubular member for imparting movement to the movable part in an opposite direction, and means for automatically disengaging the locking device from the movable member when a predetermined movement has been imparted to such movable part by the manually operated means.

8. The combination with a movable member, of a locking device mounted for movement into or out of engagement therewith, a tubular member, a part adapted for movement within the tubular member, a connection between the movable part and locking device whereby such locking device is moved into engagement with the movable member upon movement of the movable part in one direction, automatic means for imparting such movement to the movable part, manually operated means slidably engageable with the tubular member for imparting movement to the movable part in an opposite direction, and releasable locking means coacting with the manually operated means and the tubular member for holding the movable part against the action of the automatically operating means therefor.

9. The combination with a movable member, of a locking device therefor movable into or out of engagement therewith, automatic means for maintaining the locking device in engagement with the movable member, means for relieving the locking device from the influence of such means, and automatic means for disengaging the locking device from such movable member during the period the locking device is relieved from the influence of the first named automatic means.

In testimony whereof I hereunto affix my signature in the presence of two witnesses.

HARRY E. DICK.

Witnesses:
D. W. GALL,
FREDERICK S. STITT.

Copies of this patent may be obtained for five cents each, by addressing the "Commissioner of Patents, Washington, D. C."